Patented Aug. 31, 1926.

1,598,109

UNITED STATES PATENT OFFICE.

JAMES BADDILEY, JAMES HILL, AND ALBERT RILEY, OF MANCHESTER, ENGLAND, ASSIGNORS TO BRITISH DYESTUFFS CORPORATION LIMITED, OF MANCHESTER, ENGLAND.

AZO COLORING MATTER DYEING WOOL FAST TO MILLING AND PROCESS FOR OBTAINING THE SAME.

No Drawing. Application filed September 21, 1925, Serial No. 57,777, and in England September 17, 1924.

We have invented new azo dyestuffs which dye wool giving useful shades fast to milling.

Our new dyestuffs are obtained by preparing a suitable condensation product by the action of formaldehyde on an amine in the form of its hydrochloride, diazotizing this and then combining it with sulphonated azo dye components, in particular with sulphonated pyrazolones, naphthol and amino naphthol sulpho acids. The structural formula of the bodies produced is at present unknown.

Anhydro bases from primary amines and formaldehyde may be obtained in a variety of ways as a reference to the literature will show (for example, British Patent No. 1963/95, German Patents 83544, 93540, 95600, 96851, 96852, 97762, Berichte 33, p. 250; J. Russ. Phys. Chem. Soc. Vol. 37, p. 1255 and p. 1272; Vol. 44, p. 1196 and p. 1200, and German Patent 308,839), but the simplest and most economical way of preparing the diazotizable compounds used in carrying out this invention is by the action of formaldehyde on the amine in the form of its hydrochloride. This is illustrated in the example (1) below.

In the German Patent No. 308,839, Nastukoff & Croneberg describe the production of condensation products from formaldehyde and aromatic amines in the presence of acid, and further state that the diazo compounds of these bodies can be developed on vegetable fibre with suitable components, such as β-naphthol, salicylic anilides or pyrazolone derivatives. The pyrazolone derivatives here referred to, like the other developers, are unsulphonated products yielding insoluble dyestuffs on the fibre. The structural formula given in this patent does not appear correct.

The present invention consists in the discovery that new dyestuffs which dye wool in useful shades fast to milling are obtained when anhydro bases of the type defined above are treated with nitrous acid and then coupled with suitable sulphonated azo components, such as sulphonated pyrazolones, naphthol sulphonic acids and the like.

An example of one way in which our invention may be carried out is as follows:—

(a) *Preparation of base.*

93 parts of aniline are dissolved in 200 parts of water by the addition of 106 parts of hydrochloric acid (36° Tw.) so that the solution is faintly acid to Congo paper. To the solution (at 20° C. or thereabouts) 90 parts of formaldehyde solution (containing 38.7 grams $CH_2O$ in 100 ccs.) is added. The temperature rises to about 60° C., and the solution acquires a deep yellow color. The clear solution is kept for 24 hours, and then diluted with water. The solution may be used as such or the base may be precipitated as a white solid by the addition of an excess of alkali, then filtered off, washed and dried.

(b) *Preparation of dye.*

The base obtained by the above process is dissolved in the equivalent amount of hydrochloric acid (10 per cent solution), or the total reaction liquor may be used as stated above. To the clear solution are added 730 parts of hydrochloric acid (10 per cent) and 4,000 parts of water, and the solution is then cooled to 5° C. and diazotized by the gradual addition of 70 parts sodium nitrite in the usual way. The diazo solution is then poured into a solution of 254 parts 1-p. sulpho-phenyl-3-methyl-5-pyrazolone made by dissolving the pyrazolone in 3,000 parts water and 40 parts caustic soda and adding 160 parts sodium carbonate, the mixture being then stirred until coupling is complete. The dyestuff is then isolated in the usual way, dried and ground. It dyes wool in clear yellow shades, fast to milling.

The anhydro base employed in the above example may be replaced by similar bases derived from other primary amines, the shades of the resulting dyestuffs being thereby influenced according to the generally recognized rules. The anhydro bases from orthoanisidine, meta-nitraniline, β-naphthylamine, and the like may be used in this way to vary the shade, the valuable milling properties remaining.

If in the above example instead of the sulphophenylmethylpyrazolone, an equivalent amount of 1-(2.5-dichlor-4-sulpho)phenyl-3-methyl-5-pyrazolone is used, a dyestuff having similar fastness properties but of a more greenish-yellow shade is obtained. Similarly, 2-naphthol-6-sulphonic acid gives a yellowish-red; 2.8-aminonaphthol-6-sulphonic acid (combined in acid solution) gives a brown, and 2.7-naphthylamine sulphonic acid gives an orange brown.

What we claim is—

1. New azo coloring matters dyeing wool fast to milling in various shades, which can be obtained by diazotizing the condensation product of formaldehyde and a single primary aromatic amine and combining with sulphonated azo dye components.

2. Azo coloring matters dyeing wool fast to milling, which can be obtained by combining the condensation product of aniline with formaldehyde, with a sulphonated phenyl-methyl-pyrazolone.

3. The process of manufacturing azo coloring matters by preparing a diazotizable compound by the action of formaldehyde on a single primary aromatic amine in the form of its hydrochloride, diazotizing this and then combining it with a sulphonated azo dye component.

4. The process of manufacturing azo coloring matters by preparing a diazotizable compound by the action of formaldehyde on aniline in the form of its hydrochloride, diazotizing this and then combining it with sulpho-phenyl-methyl-pyrazolone.

In testimony whereof we have hereunto affixed our signatures.

JAMES BADDILEY.
JAMES HILL.
ALBERT RILEY.